Figure 1:
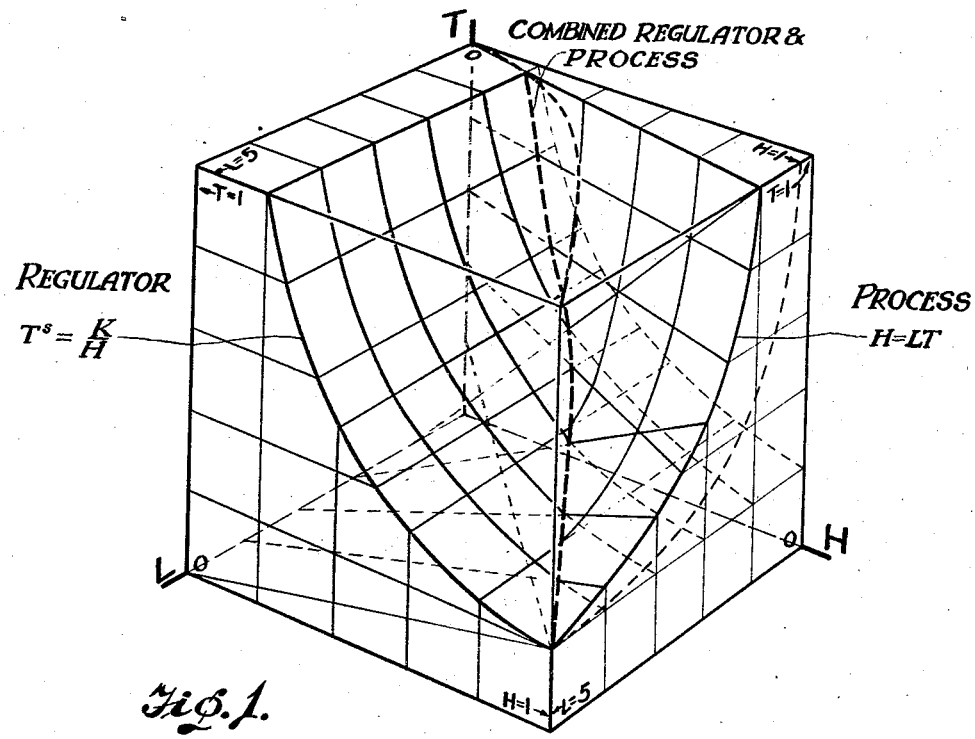

Feb. 24, 1942.    C. O. FAIRCHILD    2,274,266
ISOSENSITIVE REGULATOR
Filed Oct. 11, 1937    4 Sheets-Sheet 1

WITNESS
Ed S. Smith, Jr.

INVENTOR.
Charles O. Fairchild
BY
ATTORNEYS.

Feb. 24, 1942.  C. O. FAIRCHILD  2,274,266
ISOSENSITIVE REGULATOR
Filed Oct. 11, 1937  4 Sheets-Sheet 2
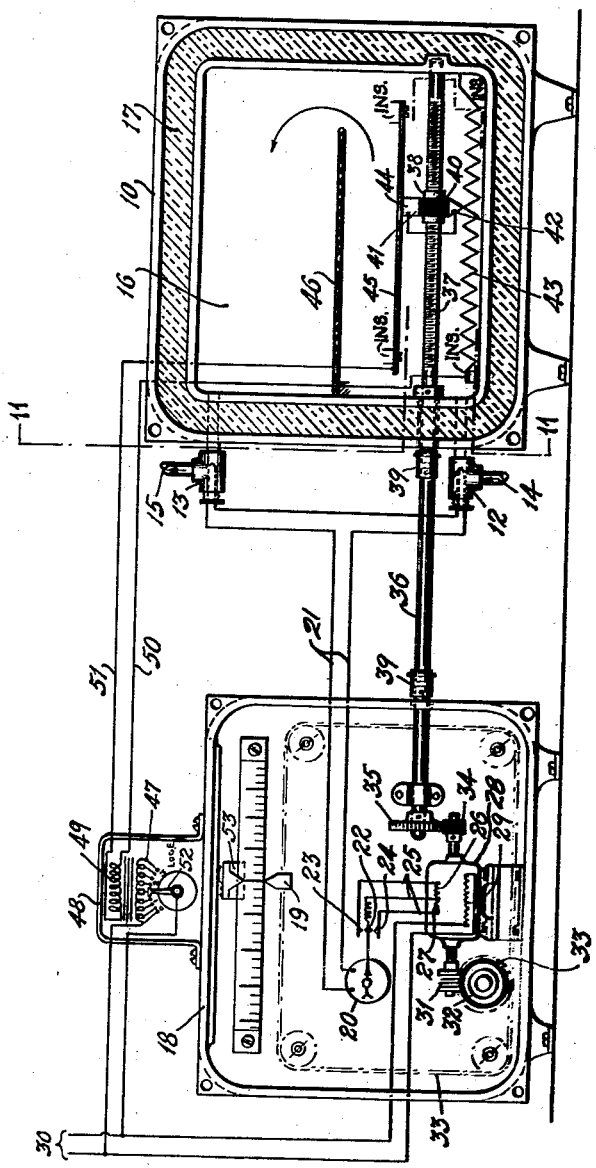
Fig. 3, FOR $T' = \frac{K}{H}$
WITNESS
Ed S. Smith, Jr.
INVENTOR
Charles O. Fairchild
BY
ATTORNEYS Feb. 24, 1942.　　C. O. FAIRCHILD　　2,274,266
ISOSENSITIVE REGULATOR
Filed Oct. 11, 1937　　4 Sheets-Sheet 3
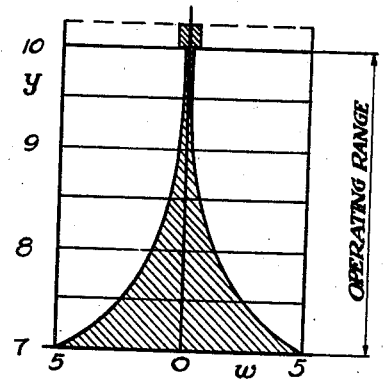
Fig. 4a.
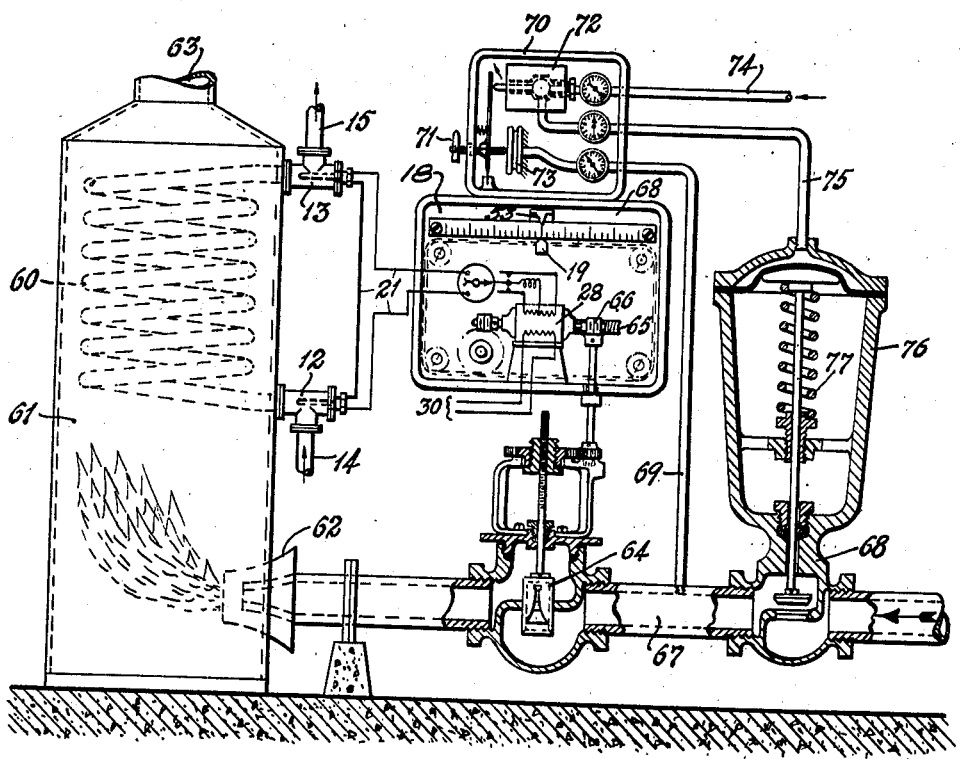
Fig. 4, FOR $T^s = \dfrac{K}{H}$
(S=10)
INVENTOR
Charles O. Fairchild Feb. 24, 1942.   C. O. FAIRCHILD   2,274,266
ISOSENSITIVE REGULATOR
Filed Oct. 11, 1937   4 Sheets-Sheet 4
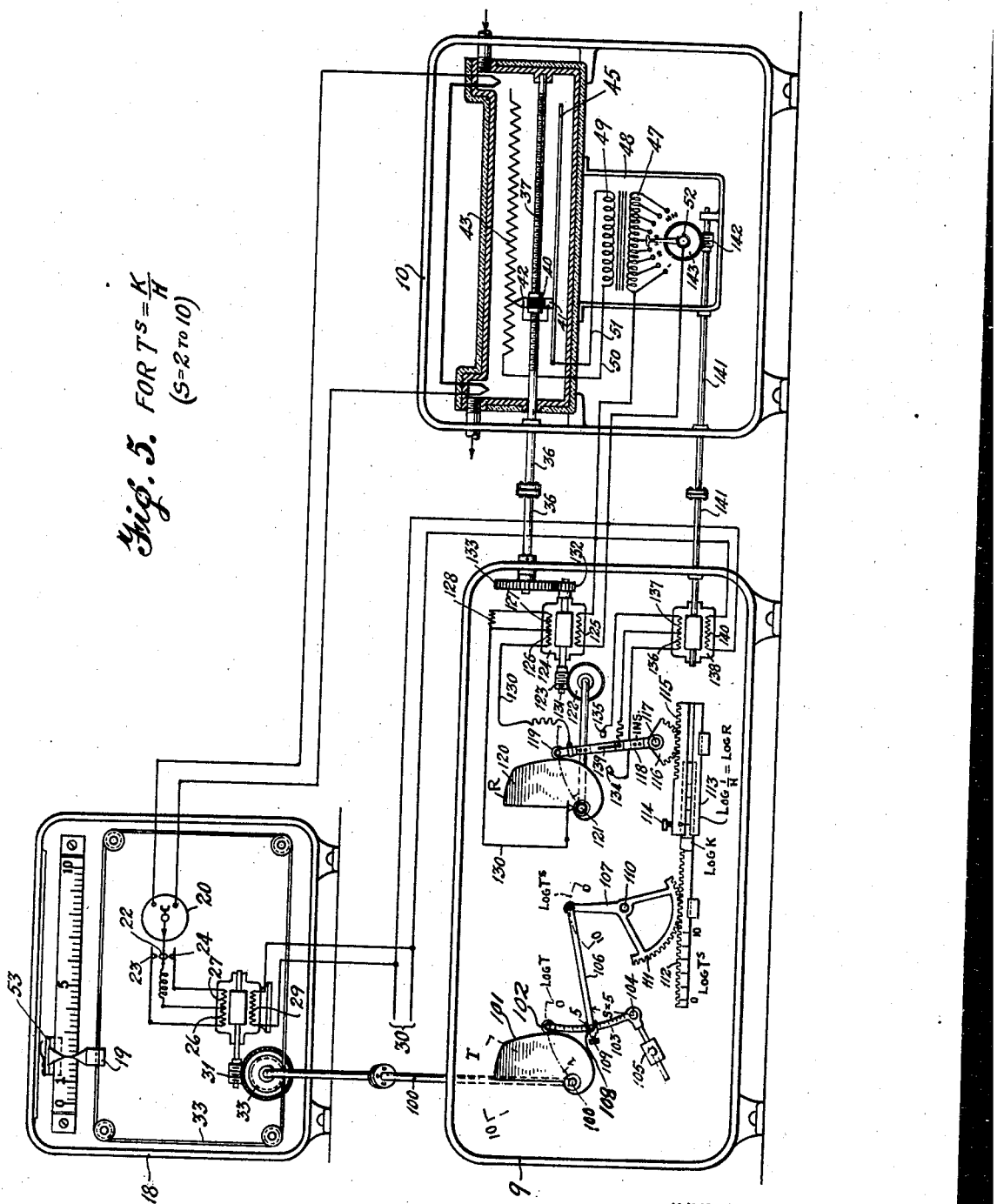
Fig. 5. FOR T$^s$ = $\frac{K}{H}$
(S=2 to 10)
WITNESS
Ed J. Smith, Jr.
INVENTOR
Charles O. Fairchild
BY
ATTORNEYS

UNITED STATES PATENT OFFICE 2,274,266

ISOSENSITIVE REGULATOR

Charles O. Fairchild, St. Albans, N. Y., assignor to Charles J. Tagliabue Mfg. Co., Brooklyn, N. Y., a corporation of New York Application October 11, 1937, Serial No. 168,445

25 Claims. (Cl. 236—1)

The present invention relates to automatic regulators and more particularly to a regulator for automatically controlling a physical condition such as temperature or pressure, and in particular an apparatus of this kind in which there is a predetermined relation between the indicated variable and that controlled, e. g. between an indicated temperature and a corresponding heat input rate, such regulators being of the class known as "corresponding" or, more loosely, "proportional."

In the known types of the corresponding class of regulators, the controlled means is merely positioned in the opposite direction from that of the indicated variable showing a change thereof by an amount generally proportional to the magnitude of such change. Although such regulators are in wide use, still I have found that their performance may be radically improved by departing from the conventional negative-proportional relation between the indicated and the controlled variable.

To most stably maintain the indicated variable within a band, bounded by given predetermined limits, near its set value, it is essential that the over-all sensitivity s' of the regulator and its controlled process be constant over such entire control band. The overall sensitivity s' of a temperature regulator, e. g., as used herein is numerically equal to the number of degrees of rise of actual temperature resulting from a manually-produced lowering of the indicating portion of the regulator of one degree, all other conditions being constant; more broadly stated, it is simply the ratio of "effect" to "cause," stated in the same units, for the whole regulator. It is the principal object of my invention to provide such an iso-sensitive regulator for the first time. From a study of the fundamentals, I have discovered that such a regulator must have an inverse relation between the indicated and the controlled variable instead of a negative-proportional relation.

A particular object of my invention is to provide a temperature regulator in which the utmost possible sensitivity is obtained in a simple corresponding regulator with uniform stability throughout. Still a further object of the present invention is the provision of an electrically operated controller in my improved iso-sensitive regulator, which controller is unique as to its simplicity and effectiveness. The above mentioned long-sought objects of the present invention are attained by the devices disclosed herein which are believed to provide a simple regulator which for the first time can control a processing plant with a truly constant maximum overall sensitivity over a wide range, increasingly wider ranges being required by the advance of the modern process industries. Since my regulator is especially adapted for any system in which a controlled quantity-rate affects the value of a physical variable to be regulated and since as is mathematically shown in the early portion of the specification all process control problems, i. e. both batch and continuous processes, fall under this classification, it follows that the field of application of my regulator is universal and is in no way limited to those specific cases which will be cited for convenience only in describing the detailed construction and operation of the few preferred modifications of my regulator. These and other objects of my invention will appear to those skilled in the art from the accompanying drawings and specification, in which are illustrated and described several embodiments of the invention. It is my intention to claim all that I have disclosed which is new and useful and of a patentable nature.

Figure 2:
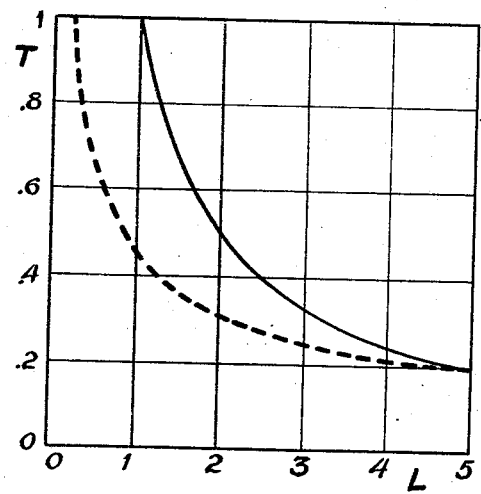

In the figures, wherein like characters indicate like parts thereon: Fig. 1 is a conventionally perspective view of a geometrical solid diagrammatically showing the relations between the variables: temperature T, heat H and load L for both the controlled process and its iso-sensitive regulator. Fig. 2 is a graph of temperature as the ordinate against the load plotted as the abscissa for the combined regulator and process. Fig. 3 is a diagrammatic view of an electrical heater for a process load comprising a stream of fluid flowing past a heating resistor in an insulated conduit so that the rise of temperature across the heater is maintained substantially constant by my iso-sensitive regulator. Fig. 4 is a diagrammatic view of a gas fuel controller used to regulate the temperature of oil of a continuous process, e. g. as in oil cracking. Fig. 4a is a graph showing the shape of the port opening in the controlling valve of Fig. 4. Fig. 5 is a diagrammatic view, generally similar to Fig. 3 in which the governing means is modified so that both the setting point and the overall sensitivity may be adjusted; this is shown as typical of a heater for a continuous flow of fluid such as might be needed in any continuous process, e. g. oil cracking.

The application of this invention to the particular apparatuses illustrated in Figs. 3, 4 and 5 is by way of example for the purposes of illustrating the adaptability of the invention. It is, however, to be understood that this invention may be used in connection with any heating or other processes, either continuous or batch as, e. g. in connection with any process in which one variable is regulated by controlling another which reacts upon the first variable. Typical examples of such processes are in cracking oil, controlling temperature of glass being fed to bottle-making machines, cooking sugar-beets, regulating a level by controlling flow, drying or humidifying in the arts generally, digesting as in the chemical industries, regulating voltage by controlling generator speed, and processes in many other arts.

Continuous process regulation

Before describing my unique regulator and how it attains the desired end, it is necessary to first describe the fundamental relations involved. These are shown graphically in Fig. 1 in which the hyperbola on the T—H face of the "solid" represents the characteristic relation of the indicated temperature rise and its corresponding heat input for my iso-sensitive regulator.

Consider a regulator which has for its equation:

$$T^s = K/H \qquad (1)$$

For a continuous process without appreciable heat loss by radiation, conduction, convection, etc. from the fluid being heated, the rectangular hyperbolic relation is shown in Fig. 1 and the equation is $$H = LT \qquad (2)$$

where, and below,

T in °F. is indicated temperature rise
H in B.t.u./sec. is heat input=heat output to fluid
L in $$\frac{\text{B. t. u.}}{\text{Sec. °F.}}$$

is load due to flow of fluid being heated
K is a constant
s is a constant exponent
s' is the overall sensitivity of the combined regulator and plant In Fig. 1, $s=1$, $K=1/5$ and maximum values for T and H are shown as unity while that of L is taken as 5, the L scale being made equal in length to those for T and H so that the "solid" shown is that of a cube. The intersection of the regulator surface with that of the process is indicated by a heavy dash line. In Fig. 2, the trace of such intersection is shown on the L—T plane for $H=1$ as a heavy dash line while the intersection of the process itself with this L—T plane is shown as a solid line. The equation of the trace is obtained by combining the Equations 1 and 2

$$T^{s+1} = \frac{K}{L} \qquad (3)$$

differentiating (3), we have $$(s+1)T^s dT = -\frac{K dL}{L^2} \qquad (4)$$

and dividing (4) by (3), $$\frac{(s+1)dT}{T} = -\frac{dL}{L} \qquad (5)$$

or $$\frac{dT}{T} = -\frac{1}{s+1}\frac{dL}{L} \qquad (6)$$

Equation 6 states in familiar terms that, for a given percentage change in load L, there is a corresponding opposite percentage change of T, of $$\frac{1}{s+1}$$

as much.

An explanation of the significance of the overall sensitivity s' of an iso-sensitive regulator, i. e. one which acts according to Equation 1, as follows:

Suppose that such a regulator in normal operation, maintaining the temperature rise constant at the control point, is forcibly changed by holding its indicating element off the control point by a positive amount $dT$, until the temperature at a constant load $L_1$ becomes steady. The change in heat input will be, from Equation 1, for the regulator alone, $$dH = -s\frac{H}{T}dT \qquad (7)$$

Now, if the indicating element be suddenly released, it will deflect by a negative amount determined by Equation 2 putting $L_1$ for L, or in other words, due to the effect of the change $dH$ of heat input to the process, the actual temperature change $(dT)_a$ resulting is $$-(dT)_a = -\frac{dH}{L_1} = -\frac{T}{H}dH \qquad (8)$$

and from (7), for the regulator alone, $$(dT)_a = -s\ dT \qquad (9)$$

so that, for this case, $$s' = -\frac{(dT)_a}{dT} = s \qquad (9a)$$

and the overall sensitivity s' must be constant with this continuous process when the regulator exponent s is constant.

That is, the magnitude of the correction imposed by the regulator is s' times the "observed" change in T. The minus sign results from the artifice of forcible holding.

Hence we may state that the overall sensitivity s' is the temperature correction divided by the temperature change as observed at the indicator, or that the regulator corrects the temperature by s' times as much as its detected, or measured, change in temperature, indisputably a performance characteristic which we may logically describe as overall sensitivity s'. Since the foregoing mathematical analysis has demonstrated that the regulator of Equation 1 has a truly constant overall sensitivity s', the equation for such a regulator combined with a continuous process being $$T^{s'} = K/H \qquad (1a)$$

Batch process regulation

It is necessary to consider the performance of my iso-sensitive regulator on a batch process since this case is still common per se in the process industries, and also because each continuous process breaks down into a batch process as the no-load condition is approached.

The equivalents of Equations 3 and 6 can be derived for the general case of batch heating processes as follows:

$$H = h \qquad (10)$$

is the simplest equation representing the heat balance of the uncontrolled plant, and states that the heat input H is equal to the heat loss $h$. This applies after the heating up period and during the "holding" or "soaking" period when accuracy of regulation is significant.

$$T^n = ch \qquad (11)$$

relating temperature and heat loss in a sufficient approximation for our present purpose, $n$ usually has a value between 1.0 and 2.0. From (10) and (11)

$$T^n = cH \qquad (12)$$

which may be regarded as the temperature balance equation of the uncontrolled plant.

As before, the regulator acts, with sensitivity $s$, to decrease H as T increases according to Equation 1:

$$T^s = \frac{K}{H} \qquad (1)$$

Now we will assume that the load $h$ varies only with temperature and that the heat input H, changing independently, is partially corrected by the regulator, which in so doing permits necessarily, a departure from the control point. The mechanics of such variation of the heat input H may be taken care of by having the heat input be due to fuel flow under pressure $p$ through a control valve of opening area A and the constants such that $$H = Ap \qquad (13)$$

To fix the design of the opening area of the valve, take a fixed pressure $p_c$ at the control point and accept the area $A_c$ obtained from (13) for the heat input then required for the plant. The relation between the temperature T and the valve opening A of the regulator is $$A = \frac{K}{p_c T^s} \qquad (14)$$

and of its heat input is $$Ap = \frac{K}{p_c T^s} p \qquad (15)$$

which can be combined with the heat input relation (12) for the plant under steady conditions, i. e., when the heat input equals the loss and when the temperature measured by the regulator equals that of the plant, $$\frac{K}{p_c T^s} p = \frac{T^n}{c} \qquad (16)$$

or $$T^{s+n} = \frac{Kc}{p_c} p \qquad (17)$$

and by differentiating, $$(s+n) T^{s+n} \frac{dT}{T} = \frac{Kc}{p_c} dp \qquad (18)$$

and division by (17), $$\frac{dT}{T} = \frac{1}{s+n} \frac{dp}{p} \qquad (19)$$

This equation differs from Equation 6 by the absence of the minus sign and states that for a given percentage change of heat input due to a change of fuel supply pressure which is now the independent variable, there is a corresponding percentage change of T, of $$\frac{1}{s+n}$$

as much. As before, this represents an error or a failure of the regulator to fully correct for an independent change in heat input. It is interesting to note that $n$, the exponent in Equation 12, appears in Equation 19 as a self-regulation factor, assisting the regulator. Since $n$ is small, its effect is unimportant unless $s$ is small also.

In temperature control, it is generally possible to use such high sensitivities that the additional effect of the heat loss exponent $n$ is usually negligible, the use of an average value of 1.5 being entirely adequate for commercial purposes. In other words, the same overall sensitivity is obtained in practice with an exponents of 1.5 less than that for a continuous process. Since the effect of $n$ is always on the safe side in respect to load error and varies from zero with a purely continuous process to approximately two for a purely batch process, it is a simplification and generally close enough to use an average $n$ of 1 for low loads with a continuous process in predetermining the sensitivity of the regulator. In practice, this iso-sensitive regulator designed for a continuous process will work in an entirely satisfactory manner on a batch process.

Suppose that such a regulator in normal operation, maintaining the temperature rise constant at the control point, is forcibly changed by holding its indicating element off the control point by a positive amount $dT_c$, until the temperature has again become constant with all other conditions steady. The change in the heat input will be, from Equation 1

$$dH = -s \frac{H}{T} dT \qquad (20)$$

Now if the indicating element be suddenly released, it will deflect by a negative amount determined from Equation 12 as follows:

By differentiating (12) and taking $(dT)_a$ as before, $$dH = \frac{nT^n}{cT}(dT)_a \qquad (21)$$

so that from (20) and (21)

$$(dT)_a = -s \frac{H}{T} dT \frac{c}{n} \frac{T}{T^n} = -\frac{sc}{n} \frac{H}{T^n} dT \qquad (22)$$

and since from (12), $$\frac{H}{T^n} = \frac{1}{c} \qquad (23)$$

From (22) and (23)

$$(dT)_a = -\frac{s}{n} dT \qquad (24)$$

and the overall $$s' = -\frac{(dT)_a}{dT} = \frac{s}{n} \qquad (25)$$

Thus, with such a regulator with such a batch process, the overall sensitivity of regulation is constant, the minus sign resulting as before from the artifice of forcible holding.

Having expounded the fundamental principles involved in an iso-sensitive regulator, there follows a description of general embodiments of the invention in which an overall sensitivity is attained uniformly throughout the entire working range of each of such regulators.

*Fig. 3, Iso-sensitive regulator of unit sensitivity*

The embodiment of the invention shown in Fig. 3 is primarily for the purpose of illustrating a simple form of the invention in which the overall sensitivity is unity. Such a regulator will have, from Equation 6, one-half the percentage change of temperature, following a change of load, that would exist without any regulator and with constant heat input. However, such a regulator may be useful where the load is fairly steady. After describing this elementary form, more complex embodiments suited for high and adjustable sensitivity are illustrated in Figs. 4 and 5 and described later. In other words, the more complex forms of the embodiments will be more readily understood after having first illustrated and described the simplest form.

In the embodiment of the invention shown in Fig. 3, the temperature rise of fluid flowing through a continuous heater 10, i. e. process, is regulated by regulator 11. For instance, the apparatus as shown in Fig. 3 could be used to raise the temperature of a stream of air flowing to an apparatus in which it is desired to keep the temperature at some elevated point. Regulator 11 comprises thermocouples 12 and 13 respectively sensitive to the inflowing and outflowing fluid in lines 14 and 15 connected to heating chamber 16 which is well insulated by insulation 17 against appreciable heat losses, relative to the heat input H for the load L due to the fluid flow. Potentiometer 18 has indicator 19 continuously positioned in correspondence with the temperature rise between thermocouples 12 and 13 which are connected to galvanometer 20 by thermocouple circuit 21 which also includes a slidewire (not shown) along which indicator 19 moves a sliding contact. Galvanometer 20 positions contact switch blade 22 relative to contacts 23 and 24 which, with blade 22, are connected by direction controlling circuit 25 with the secondary shading coils 26 and 27 of reversible motor 28, the primary induction coil 29 of which is connected with A. C. supply 30, all in a conventional manner, contacts 23 and 24 being sufficiently separated to provide a dead-zone in which blade 22 does not touch either contact 23 or 24 when galvanometer 20 is balanced. This condition of balance occurs when indicator 19 is at a temperature corresponding with the rise between thermocouples 12 and 13. Motor 28 turns single thread worm 31 to slowly turn its worm wheel 32, this worm wheel being connected by connecting means 33 with indicator 19. Motor 28 also drives spur pinion 34 and its coacting spur gear 35 which is connected with one end of shaft 36 to turn this shaft through an angle proportional with the displacement of indicator 19 from a fixed point on its scale. The other end of shaft 36 includes threaded portion 37 which carries a nut 38. While free to rotate, shaft 36 is restrained against axial movement as by collars 39. Nut 38 is attached by an insulated sleeve 40 with sliding contactor 41, one portion of which 42 is adapted to lightly abut lineal resistor 43 and has another contacting portion 44 similarly adapted to slide along conductor rod 45, both resistor 43 and conductor rod 45 being disposed parallel with the axis of shaft 36 to guide contactor 41 so that it is restrained against rotation while free to move axially along shaft 36. Resistor 43 is shown extending substantially along the entire length of one wall of heating chamber 16.

Baffle 46 is disposed within this chamber to define the path of the fluid and thus insure positive response of the temperature of the outflowing fluid to changes in the heat input from resistor 43. A. C. supply 30 is also connected with the adjustable primary 47 of manually adjustable transformer 48, one line of supply 30 being shown attached to the left-hand end of primary 47 and the other line of supply 30 being attached to its selective switch 52. Transformer 48 has the right-hand end of its secondary 49 attached by lead 50 with the left-hand end of resistor 43. Lead line 51 connects conductor bar 45, for sliding contactor 41, with the left-hand end of transformer secondary 49. Index 53 is adjustable along its scale 37 to indicate the setting point to an attendant. The adjustment of the parts is such as to attain the result set forth in Equations 20–24, i. e., portion 42 of sliding contactor 41 is substantially at the left-hand end (zero resistance end) of resistor 43 when indicator 19 is at its position which corresponds with a differential temperature of zero so that there is no appreciable resistance of the secondary circuit including resistor 43, lead lines 50—51 and transformer secondary 49, neglecting any effect of the impedance of secondary 49 which impedance can readily be made so low as to be negligible or readily adjusted for by one skilled in the art.

Where a constant voltage E is between leads 50 and 51 from adjustable-tap transformer 48, the well-known relation between resistance R of resistor 43, voltage E and current I is $$I = \frac{E}{R} \tag{26}$$

and heat input H in watts is $$H = EI = \frac{E^2}{R} \tag{27}$$

or, since the voltage E is constant $$H = \frac{K'}{R} \tag{28}$$

and since the resistance R is directly proportional to the indicated temperature rise, then $$H = \frac{K}{T} \tag{29}$$

or $$T' = \frac{K}{H} \tag{30}$$

which is seen to be the same as Equation 1 with an overall sensitivity $s'$ and regulator sensitivity $s$ of unity. This embodiment and its figure have deliberately been simplified to the utmost for clearness of exposition; however, its disclosure is submitted as adequate, i. e. anyone skilled in this art could make a successful and highly useful regulator for its intended purpose by following such disclosure.

The operation of the device shown in Fig. 3 is as follows: an attendant sets index 53 at the desired temperature rise for any given load, which load is determined by the flow through heating chamber 16. For any given load, he turns switch 52 to such a position that the heat input to resistor 43 is just enough to bring the temperature rise, as indicated by indicator 19, to the value indicated by index 53. Upon a small change $dL$ of load L to a new value, the temperature rise $dT$ will change correspondingly according to Equation 6. This change is only half of that which would occur if the regulator did not alter the position of sliding contactor 42 along its resistor 43. Reference to Equations 1 and 3 shows that this over-all sensitivity is constant for all changes of load within the limits of travel of sliding contactor 42 along resistor 43. If such load change is large enough so that the resulting temperature drift is larger than is desirable, as shown by the deflection of indicator 19 from its index 53, the attendant again alters the position of selector switch 52 to bring indicator 19 into alignment with its index 53. However, even with this new load, it will be seen from the equations that the overall sensitivity of the controlled process is still constant and unity. As earlier mentioned, while such a low sensitivity device would have only limited usefulness, still it clearly illustrates the fact that this regulator is in fact isosensitive.

*Fig. 4, Iso-sensitive regulator of high sensitivity*

Fig. 4 illustrates an embodiment of the invention giving high and constant sensitivity throughout the entire working range of the regulator so that the overall sensitivity $s'$, and consequently also the $s$ in Equation 1, is a constant considerably greater than unity. Such an application is typical of a continuous oil cracking process. Such an iso-sensitive regulator has the minimum drift consistent with stability and thus gives stable control for installations where the process capacity is so great that no other simple corresponding controller could be used, due to the fact that the latter regulator would hunt excessively at some loads though stable under others. The following are generally as in Fig. 3: inflow and outflow lines 14 and 15 respectively, thermocouples 12 and 13 therein and their circuit 21, and potentiometer 18. However, heating chamber 16 and its baffle 46 have been replaced by pipe-worm 60 which is located within a combustion chamber 61 having a burner 62 shown near the bottom and stack 63 at the top thereof.

Valve 64 is actuated through change-gearing including worm gear 65 and its single-tooth worm 66, single-tooth worm 66 being driven by motor 28 which also positions indicator 19 relative to its set index 53 on scale 37 as earlier described under Fig. 3. Valve 64 is generally of the conventional slotted piston type and in practice would be provided with limits which are wide. However, the shape of the slotted port is critical and as follows to give the relation of Equation 1:

$$T^s = \frac{K}{H} \quad (1)$$

If $y$ is the travel of the valve from its closed position and $2w$ is the width of the slot at $y$, then, assuming that the heat input $H$ is proportional to the area $A$ of the port opening, $$T^s = \frac{K'}{A} = y^s \quad (31)$$

and $$A = \int_\infty^y 2w\, dy \quad (32)$$

$$\frac{K'}{y^s} = \int_\infty^y 2w\, dy \quad (33)$$

$$\frac{-sK'dy}{y^{s+1}} = 2w\, dy \quad (34)$$

so that $$y^{s+1} = -\frac{K's}{2w} \quad (35)$$

which is the equation of the port edge, also hyperbolic. A typical case as calculated according to Equation 35 for a sensitivity $s=10$ and $y_1=7$ to $y_2=10$ and $K'=10^9$ is shown in Fig. 4a. The small rectangular portion at the tip of the slot is required to be equal to the area $A$ calculated from $y=\infty$ to $y=10$, as follows:

$$\left[A\right]_\infty^{10} = \int_\infty^{10} 2w\, dy \quad (36)$$

or from 35

$$\left[A\right]_\infty^{10} = \int_\infty^{10} \frac{K's\, dy}{y^{s+1}} = \left[\frac{K'}{y^s}\right]_\infty^{10} = 0 + \frac{K'}{10^s} \quad (37)$$

For a different sensitivity and constant $K'$ it is necessary to change the slotted piston to another in which the port is calculated for the different constants.

Pipe 67 upstream of valve 64 is provided with pressure regulating valve 68. Line 69 connects pipe 67 with a conventional pressure regulator 70 located on top of potentiometer 18 and in which the pressure is set by moving knob 71 to a new position to thus alter the relation between air-valve 72 and the pressure in diaphragm 73 which is connected by line 69 to pipe 67. Air-supply line 74 is connected with air-valve 72 which is connected by line 75 with direct acting diaphragm top 76, the diaphragm thereof being opposed by spring 77, all in conventional manner.

The operation of the dives shown in Fig. 4 is as follows: the attendant sets index 53 at the desired control point on scale 37. Valve 64, and hence the heat input by burner 62, is maintained in correspondence with the position of indicator 19. The attendant sets the gas fuel pressure in pipe 67, upstream of valve 64, by altering the position of knob 71. Pressure regulator valve 68 then maintains this pressure. In other words, when valve 64 approaches the limits of its accurate relation between heat input and valve travel, the attendant resets the fuel pressure across valve 64 so as to alter this pressure to reset the regulator for the drift which is inevitable in any corresponding type of regulator. As previously pointed out, this general arrangement is such as to accurately maintain constant the iso-sensitivity $s'$ of the regulator. Such regulators, as are shown in Fig. 4 and described above, are ideal for oil cracking furnaces, e. g., where, as is well-known, the temperature of cracking must be stably maintained within narrow limits for economic production.

*Fig. 5, Iso-sensitive regulator of adjustable sensitivity*

In the embodiment of Fig. 5, potentiometer 18 and heater 10 are generally as in Fig. 3; however, in this embodiment, governing means 9, which connects potentiometer 18 and the heat-controlling shaft 36 for positioning contactor 41 along resistor 43 within heater 10, is so modified that the overall sensitivity $s'$ and the setting constant $K$ of Equation 1 may both be predetermined. The drawing and following description are given primarily for the purpose of illustration and the numerics used are selected for ease of description rather than as representative of any practical application.

In Fig. 5, governing means 9 is connected by shaft 100 with logarithmic cam 101 against which roller 102 bears. This roller is on one end of lever 103 which is pivotally mounted on shaft 104 which is attached to the frame of governing means 9. The arrangement is such that an even angular movement of the cam produces an angular movement of lever 103 which is proportional to the logarithm of the temperature change. Counterweight 105 is provided on a bell-crank portion of lever 103 so as to bias roller 102 towards logarithmic cam 101. The arrangement is such that the axis of roller 102 moves through a distance proportional to the logarithm of the temperature indicated by the potentiometer, i. e., as log $T$. Lever 103 is arcuately formed to provide a variable radius linkage with link 106 and lever 107, the ends of link 106 being pivotally connected to 107 and to an adjustable arcuate block 108 having clamping screw 109 thereon. The arrangement is such that a substantially parallel-motion relationship exists between levers 103 and 107 when log cam 101 is in its zero position and block 108 set at a sensitivity $s$ of 6. As earlier mentioned, this regulator sensitivity $s$ equals the overall sensitivity $s'$ for the continuous process of Fig. 5. In the figure, this block is shown clamped by screw 109 at a sensitivity $s$ of 5. The radial distance of the pivotal center of the end of link 106 from the center of shaft 104 is seen to correspond with the sensitivity $s$ and the arrangement is such that the upper end of lever 107 is displaced an extent proportional to log T$^s$.

Lever 107 is pivotally mounted on shaft 110 and has a depending segmental gear portion 111. Coacting with this gear is its rack 112 which is arranged to slide in operative relation therewith. Rack 112 is seen to be graduated on its front face with a scale for the K of Equation 1. Sleeve 113 is slidingly affixed to rack 112 and clamped thereto in any desired position by means of clamping screw 114. The arrangement is such that the relative positions of sleeve 113 and rack 112 may be adjusted to alter the value of K, and hence the temperature setting for any given sensitivity s, a graph or table for s, T and K being conveniently used by the attendant in setting to a new value of either s or T.

The upper side of the right hand end of sleeve 113 forms a rack 115 for a segmental gear 116 which is pivotally attached to the frame of governing means 9 by shaft 117. Lever 118 is affixed to gear 116 and provided with roller contact 119 for log cam 120 which is mounted on shaft 121. The arrangement is such that log cam 120 removes the logarithm inserted by log cam 101 with the result that the angular position of shaft 121 varies inversely with the heat input and varies directly with the desired resistance of the effective portion of resistor 43 between line wire 50 at one end thereof and sliding contactor 41 which is connected with line wire 51. The arrangement of the parts within heater 10 is as heretofore described. Worm wheel 122 on shaft 121 is actuated by its worm 123 which is driven by reversible motor 124 having field coil 125 attached to A. C. supply lines 30. This motor is of the shading coil type having two sets of shading coils 126 and 127 respectively. Fixed resistor 128 is connected across the terminals of shading coil 127 which operates motor 124, when the ends of shading coil 126 are open, in such a direction as to move cam 120 towards contactor 119, cam 120 and its contactor 119 being connected by lines 130 with the ends of shading coils 126 so that as soon as the cam 120 touches contact 119, motor 124 reverses. The result is that cam 120 is continuously maintained in a humming hunting contact with roller 119 and the shaft 131 of motor 124 is maintained in proper regulating relation. Pinion gear 132 affixed to the other end of shaft 131, meshes with spur gear 133 which is so affixed to shaft 36 as to drive the same.

From the foregoing it is clear that this iso-sensitive regulator positions this controller within operating limits fixed by the length of resistor 43 and the possible travel of contactor 41 along the threaded portion 37 of shaft 36. However, with such an iso-sensitive regulator, i. e. for s between 2 and 10, the operating demands may be such as to cause the controller to reach its limits. Contacts 134 and 135 are respectively attached to the ends of shading coils 136 and 137 of reversible motor 138, the other end of each of said coils 136 and 137 being attached to switch blade 139 on lever 118. Field coil 140 of motor 138 is connected with A. C. supply line 30. Shaft 141 of motor 138 has affixed thereon worm 142 and its worm wheel 143 is positioned thereby, this wheel being attached to selective switch 52 of variable transformer 48 which is as described under Fig. 3. The arrangement is such that whenever blade 139 reaches either of its contacts 134 or 135, motor 138 will operate to reset switch 52 of transformer 48 in such a direction as to alter the voltage potential across resistor 43 to bring contactor 41 away from its limits and back into the effective portion of its range. Actually, contacts 134 and 135 will be set well within the operating limits of controlling contactor 41 so that a relatively slow motion of its reset means, i. e. of selective switch 52, will take care of any tendency for the controller to drift outside its limits.

Since the operation of the embodiment shown in Fig. 5 has been described as the figure was described, further detailed description is not required. However, it may be well to give the following brief description of this operation: the potentiometer directly positions log cam 101 so that roller 102 follows log T. The overall sensitivity is predetermined by adjusting block 108 to a radius corresponding with s. The resulting motion of the upper end of lever 107 and of gear segment 111 and its rack 112 thus corresponds with log T$^s$. Sleeve 113 is adjusted relative to rack 112 to introduce the desired setting constant K. The short radius of segmental gear 116 relative to the length of lever 118 (radii 1/5) permits the use of the same shapes for both antilog cam 120 and log cam 101. Reversing motor 124 maintains the effective length of resistor 43 proportional to the inverse of the heat input required, generally as explained under Fig. 3. Motor 138 gives an automatic limit reset for the potential across resistor 43 with the result that the iso-sensitivity of this regulator is insured under a very wide range of loads. Thus it is seen that the operative relation between the potentiometer and the variable resistance of Fig. 5 is in general as in Fig. 3. The automatic potential-reset of Fig. 5 is similar to the manually adjusted pressure-reset of Fig. 4, both resets functioning to extend the range of the controller. The "slide rule" logarithmic mechanism of Fig. 5 is provided, as aforementioned, with anti-logarithmic means so that, if it were practicable to set an overall sensitivity s' of unity, the relation of the variable resistance to the indicator of the potentiometer would be identical with that for the regulator of Fig. 3. In resumé, the illustrative device of Fig. 3 has an overall sensitivity of unity and employs the inverse electrical relation of $I=E/R$ for the heating current of an electrical furnace; in the illustrative embodiment of Fig. 4, the potentiometer operates as in Fig. 3 to position a valve shaped to produce a constant overall sensitivity of 10 instead of altering the variable resistance of Fig. 3 to produce an overall sensitivity of unity, a manually-adjustable pneumatic reset being used to extend the operating range of the regulator; and in Fig. 5 the constant overall sensitivity may be set at any desired value from 2 to 10, an automatic potential-reset replacing the manually-adjustable pressure-reset of Fig. 4.

The outstanding desirable result of using such an iso-sensitive regulator is that the sensitivity can be set, at any convenient condition, at the highest possible value at which it will not there cause hunting, and thereafter it will operate throughout its entire range without hunting; a major advantage of such maximum sensitivity being that load errors are thereby reduced to a minimum.

In the practical design of an iso-sensitive regulator, it is first necessary to specify the load and the temperature requirements of the process, and also the characteristics of the heat source. Having these, the selection of a valve of the proper size for a specified fuel supply, or of an electric heater for a specified voltage, either of which for a specified load and temperature, is accomplished by the use of Equations 1 and 2. From Equation 2, H is first determined for the specified load L and temperature T and then from Equation 1, rewritten as $K=HT^s$, K is determined for the same T and H, using a value of $s'$ consistent with experience and well within the range of adjustment of $s$.

The terms and expressions which I have employed in the specification are used as terms of description and not of limitation, and I have no intention, in the use of such terms and expressions in the claims, of excluding except herein below noted any equivalents of the features shown and described and portions thereof, but recognize that various modifications are possible within the scope of the invention claimed. For example, obviously, electrical, or even hydraulic, means may be used by anyone skilled in the art within the teachings of the present invention, mechanical embodiments of which have been shown purely for convenience. Also this type of regulator may be used equally well for other physical conditions than temperature as long as the fundamental relations involved are similar. In defining the intended meaning of the language of the claims: an "inverse relation" of two variables such as H and T is one in which H varies as $$\frac{1}{T^m}$$

where $m$ is a substantially constant exponent, an inverse relation appearing on log-log graph paper as a truly straight line which slopes downward with an increase of the value of the abscissa variable; a "physical variable" is one such as temperature, pressure, voltage or the like which is variable with time; and a "quantity-rate" is one such as cubic feet/sec. of liquid, pounds (mass)/sec. of any material liquid or granular, heat input rate in B. t. u.'s/sec. or the like in which the rate of feeding affects a physical variable.

I claim:

1. The method of regulating a sensed physical variable T which comprises controlling within limits a quantity-rate H, which increases T when H is increased, to maintain the relation $$T^s = K/H$$

where $s$ is the regulator's sensitivity and constant within such limits and K is the setting constant, whereby the overall sensitivity of regulation is accurately constant over the stated limits of controlling.

2. A regulated system comprising, in combination, a process in which a physical variable of the potential class, such as temperature or pressure, is to be regulated by controlling the rate of supplying a physical quantity, which increases the value of such potential when increased, and a regulator for said process comprising a measuring element positioned in correspondence with the value of the potential, and a controller operatively connected with the measuring element and governed thereby through a predetermined operating range to therein control the quantity-rate in an accurate inverse constant-exponential relation with the measured value of the potential, whereby the overall sensitivity of regulation is substantially constant over the major portion of such operating range.

3. A regulated system comprising, in combination, a continuous process in which a physical variable T is to be regulated by controlling the rate H of supplying a physical quantity demanded by a continuous load L such as may be due to the quantity-rate of flow of material being processed and substantially according to the relation $$H = LT$$

and a regulator for the process, which regulator comprises an element sensitive to the value of T, a controller for quantity-rate H, and means operatively connected with the sensitive element and with said controller to govern said controller by said element through a predetermined operating range of values of T to control H accurately according to the relation $$T^s = K/H$$

where $s$ is the regulator's sensitivity and constant over the stated range and K is the setting constant, whereby the overall sensitivity of regulation is substantially constant over the stated range.

4. The regulated system set forth in claim 2, including means adjustable to alter the exponent of the inverse relation between the value of the variable measured by the element and that of the quantity-rate controlled by the controller from one inverse constant-exponential relation to another differing only from that first named by having a different value of said exponent and hence to alter the value of the overall sensitivity to a new constant value.

5. A regulated system comprising, in combination, a batch process in which a physical variable T such as, temperature, is to be regulated by controlling the rate H, e. g. such as heat-supply rate, of supplying a physical quantity demanded by the process as by conduction, convection, or radiation in an oven for heating material being processed, and substantially according to the relation $$H = T^n$$

where $n$ is substantially constant around the regulated value of T, and a regulator for the process and which comprises an element sensitive to the value of T, and a controller for quantity-rate H operatively connected with the sensitive element and governed thereby through a predetermined operating range of values of T to therein control H accurately according to the relation $$T^s = K/H$$

where $s$ and K are constants of the regulator, whereby the effective overall sensitivity is substantially constant and the sum of $s$ plus $n$ upon a change in the supply rate H as due to a change of a voltage of the power supply where an electrical resistor is used for heating the oven.

6. A constant overall sensitivity regulator for a physical variable T which is affected by another physical variable H where H is a rate comprising, in combination, means sensitive to the value of T, and means governed by the first named means to control H accurately according to the relation $$T^s = K/H$$

where $s$ and K are constants.

7. A constant overall sensitivity regulator for one physical variable which is affected by a second physical variable comprising, in combination, means sensitive to the value of the first named variable, and means governed by the sensitive means to control the second named variable accurately in inverse constant-exponential relation to the sensed value of the first named variable over a predetermined range of values thereof.

8. A constant overall sensitivity regulator for a physical variable of the potential class which is affected by the rate of supplying a physical quantity, which increases the value of the variable when the quantity-rate is increased, comprising, in combination, means sensitive to the variable and having an element positioned in correspondence with the value thereof, and means including a relatively movable portion positioned in correspondence with the position of said element within predetermined operating limits for controlling the quantity-rate, one of said means being so correlated to the other that the regulator maintains an accurate inverse constant-exponential relation between the variable and the quantity-rate over substantially the entire operating range, whereby a substantially constant overall sensitivity of regulation is obtained over substantially the entire operating range.

9. In a constant overall sensitivity regulator for a process temperature which is increased when there is an increase of the rate of supplying heat energy obtained from an electrical power supply under substantially constant potential, the combination of a lineal heating resistance for said process having one end connected with one side of said power supply, an element for measuring the temperature and positioned in correspondence with the value of the temperature, and a contact operatively connected with said element to be relatively movable along said resistance to maintain the value of said resistance in direct proportion to the value of the temperature and connected to the other side of said power supply and displaced from said end by an effective resistance length which corresponds directly with the value of the temperature, whereby the heat supply rate is maintained in a predetermined inverse constant-exponential proportion with the value of the temperature.

10. A regulated system comprising, in combination, an electrical power supply under substantially constant voltage, a process in which the temperature is to be regulated by controlling the rate of supplying heat energy thereto, which heat energy increases the temperature when the heat-supply rate is increased, and a constant overall sensitivity temperature regulator including a measuring element displaced from its zero position in lineal correspondence with the value of the temperature, and a controller for the heat-supply to the process comprising a lineal heating resistance having one end connected with one side of the power supply and a contact connected to the other side thereof and displaced by said element from said end by an effective resistance length which is in direct proportion with the stated displacement of the element, whereby the heat-supply rate is inversely proportional in a constant-exponential relation to the value of the temperature.

11. A system to be regulated with constant overall sensitivity comprising, in combination, a chamber for heating a fluid supplied thereto and discharged therefrom, a measuring means sensitive to at least the temperature of the fluid discharged and having an element positioned in correspondence with the measured temperature rise, a fluid heater associated with said chamber and including a resistance and a controlling member movable relatively to the resistance to control the rate of supplying heat inversely with the displacement of the member from its zero heat supplying position, and a driving means connecting the positionable element of said measuring means and the movable controlling member of the heater, one of said means being constructed to coact with the other to cause the stated displacement of the member to be in direct proportion to the value of the temperature rise.

12. An iso-sensitive temperature regulator for a fluid-fuel fired heater comprising, in combination, a thermometric measuring instrument sensitive to the temperature T and having an element positionable in direct proportion with the measured value thereof, a valve means under a differential pressure having a portion movable to control the quantity-rate of fuel flow, and a governing means operatively connecting said positionable element and the movable portion of said valve means, said valve means being constructed and correlated with said governing means to maintain the heat input H accurately according to the relation $$T^s = K/H$$

where $s$ is the regulator's sensitivity and constant and K is the setting constant, whereby the overall sensitivity is constant over the controlling range of the valve.

13. The iso-sensitive temperature regulator set forth in claim 12, including means for predetermining the differential pressure across said valve means adjustable to maintain said valve means effective, as to regulation, within the operating limits of the movable portion thereof.

14. The iso-sensitive-temperature regulator set forth in claim 12 in which said governing means actuates the movable portion of said valve means through an extent $y$ which is in arithmetic direct proportion to the measured value of the temperature T and the ports of said valve means are adapted to have an effective exposed total area A which varies according to the relation $$y^s = k/A$$

where $s$ is as stated and $k$ is a constant related to the capacity of the valve.

15. In an iso-sensitive regulator, a slotted piston valve having its piston movable between spaced limits $y_1$ and $y_2$ and having a corresponding effective total area A determined by the port width $w$ corresponding with position $y$ substantially according to the relation $$y^{s+1} = \frac{k \cdot s}{w}$$

where $s$ is the regulator's sensitivity and constant and $k$ is a constant related to the capacity of the valve.

16. An iso-sensitive regulator for a physical variable T which is affected by another physical variable H comprising, in combination, a means sensitive to the value of T and having a measuring element positioned in correspondence with such value, a means including a movable portion for controlling H to have the value of H correspond with the position of such portion; and a governing means operatively connecting said measuring element with the movable portion of the controlling means to position such portion in correspondence with the position of said element, one of said means being constructed and correlated with the others to cause the regulation relation to be $$T^s = K/H$$

where $s$ and $K$ are constants within predetermined limits of $T$; and the governing means including an adjustable portion settable to alter the relation between the positions of the measuring element and those of the movable portion of the controller to change the value of $s$ to a different constant value within such limits.

17. The iso-sensitive regulator set forth in claim 16 in which the governing means includes a separately adjustable portion which may be set to alter the relation between the positions of the measuring element and those of the movable portion of the controller to change the value of $K$, whereby the values of $T$ corresponding with both of the stated limits are altered in the same direction by a change in the setting of the last named adjustable portion.

18. The steps in the method of regulating with constant overall sensitivity a physical variable which is affected by a quantity-rate which is caused by a potential to vary in direct proportion to said potential and which variable is increased when the quantity-rate is increased, which comprise controlling said quantity-rate to maintain an accurate inverse constant-exponential relation between the value of the quantity-rate and that of said variable for any constant value of said potential of the variable between limiting values of said variable, and altering the stated potential to keep the value of the variable within such limiting values, whereby the same value of the stated exponent is maintained both within said limits and extended beyond the limits corresponding with a fixed value of said potential.

19. The steps in the method of regulation set forth in claim 18 in which the stated alteration of the potential is automatically governed by the relation of the value of the variable to such limiting values.

20. The steps in the method of iso-sensitive regulation set forth in claim 18 in which the stated alteration of the potential is automatically made when the value of the variable reaches a limit to return the variable to within the iso-sensitive regulation zone between such limits.

21. An iso-sensitive regulator for a physical variable $T$ which is affected by another variable $H$ comprising, in combination, means sensitive to the value of $T$ and having a measuring element positioned in correspondence with such value; means including a movable portion for controlling $H$ to have the value of $H$ correspond with the position of said movable portion; and a governing means operatively connecting the measuring element of the sensitive means with the movable portion of the controlling means to position such portion in correspondence with the position of said element; one of said means being constructed and correlated with the others to cause the regulation relation to be $$T^s = K/H$$

where $s$ and $K$ are constants within predetermined limits of $T$.

22. An iso-sensitive regulator for a physical variable $T$ which is affected by another variable $H$, which is a quantity-rate which affects the regulated variable and which varies in direct proportion to a potential comprising, in combination, a means sensitive to the value of $T$ and having a measuring element positioned in correspondence with such value; a means including a movable portion for controlling $H$ to vary the value of $H$ in correspondence with the position of such portion for a single value of the potential, a governing means operatively connecting the measuring element of the sensitive means with the movable portion of the controlling means to position such portion over an operating range in correspondence with the position of said element, one of said means being constructed and correlated with the others to cause the regulation relation to be $$T^s = K/H$$

where $s$ and $K$ are constants within predetermined limits of $T$, and a means adjustable to alter the value of the potential and hence the value of $H$ for any position of said movable portion within the said operating range to maintain such portion within said range without changing the value of $s$.

23. An iso-sensitive regulator for a physical variable $T$ which is affected by another physical variable $H$ which depends upon the product of two factor variables comprising, in combination, a means sensitive to the value of the regulated variable $T$ and having a measuring element positioned in correspondence with such value, a means including a movable portion for controlling $H$ by altering the value of one of said factor variables in correspondence with the position of such portion, a governing means operatively connecting said measuring element with said movable portion to position such portion in accordance with the position of said element, one of said means being constructed and correlated with the others to cause the regulation relation to be $$T^s = K/H$$

where $s$ and $K$ are constants within predetermined limits of $T$, and a means adjustable to alter the value of the other of said factor variables whereby the value of $H$ to return $T$ more precisely to a desired value than when only the stated regulation relation is followed.

24. An iso-sensitive regulator, for regulating a sensed physical variable $T$ which is affected by a quantity-rate $H$ by controlling $H$ according to the relation $T^s = K/H$, where $K$ and $s$ are constants, that comprises, in combination, a meter sensitive to the value of the variable $T$, a resistance means having a portion movable to control the value of the quantity-rate $H$ inversely with the extent of the movement of said portion from a fixed point on the low-resistance side of an operating range of said portion in which the regulator is effective, and a means for operatively connecting the meter with the resistance means to move said portion of the latter, upon a change in the sensed value of the variable, in a direction to oppose the change.

25. The iso-sensitive regulator set forth in claim 24, in which the controller portion operates over a predetermined range and the quantity-rate $H$ is affected by a potential and said regulator includes a means for changing the potential in dependence upon the position of said portion relative to said predetermined limits of its said operating range and in a direction to maintain said portion within its said operating range.

CHARLES O. FAIRCHILD.

CERTIFICATE OF CORRECTION.

Patent No. 2,274,266. February 24, 1942.

CHARLES O. FAIRCHILD.

It is hereby certified that error appears in the printed specification of the above numbered patent requiring correction as follows: Page 2, first column, lines 43 and 47, for "precess" read --process--; line 52, after the equation insert --(3)--; line 74, strike out "as"; page 5, second column, line 6, for "dives" read --device--; page 8, second column, line 35, claim 14, strike out the hyphen before "temperature"; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.